March 1, 1955 B. DARROW 2,703,132
METHOD OF MAKING PNEUMATIC TIRES HAVING EQUALIZED
STRESSES IN THE REINFORCING CORDS THEREIN
Filed Sept. 27, 1950 2 Sheets-Sheet 1

INVENTOR
BURGESS DARROW

BY
ATTORNEYS

March 1, 1955  B. DARROW  2,703,132
METHOD OF MAKING PNEUMATIC TIRES HAVING EQUALIZED
STRESSES IN THE REINFORCING CORDS THEREIN
Filed Sept. 27, 1950  2 Sheets-Sheet 2

INVENTOR
BURGESS DARROW

BY  Oldham & Oldham

ATTORNEY

2,703,132

METHOD OF MAKING PNEUMATIC TIRES HAVING EQUALIZED STRESSES IN THE REINFORCING CORDS THEREIN

Burgess Darrow, Bath Township, Summit County, Ohio

Application September 27, 1950, Serial No. 187,026

15 Claims. (Cl. 154—14)

This invention relates to pneumatic tires and the manufacture thereof, and specifically relates to an arrangement of reinforcing cords in a pneumatic tire casing whereby the stresses in the cords equalize, or tend to be equalized, during the operations of shaping and vulcanizing the tire.

Pneumatic tires are commonly built or assembled on a cylindrical drum, and after removal from the drum, the tire is shaped, which means that it is subjected to internal pressure to change the tire from a cylindrical article to an article of the customary finished tire shape.

In conventional assembling of the components of a tire on the drum, a plurality of plies or sheets of unvulcanized rubber cord are laid around the drum, one over the other, and turned around wire beads at the edges of the drum. The cords in the plies are on the bias and each cord reaches from the bead on one side of the tire to the bead on the other side.

It is desirable to have all cords in the finished tire under equal stress. However, in actual practice a number of variations occur:

1. Cords are not all twisted alike resulting in some cords being more stretched than others.
2. In the process of rubberizing, some cords are pulled and stretched more than others.
3. The amount of moisture taken up by textile cords varies from ply to ply and this effects the stretchiness of the cord.
4. In the bias cutting, there is a variation in angle.
5. In handling the plies or sheets of rubberized cord, a certain distortion occurs.
6. In assembling the plies on the drum, some distortion occurs.
7. Still another error is due to the fact that as each successive ply is laid on the drum, the tire structure becomes larger and the bias angle that is chosen for the plies as they go on the drum may be correct for some one ply but is not correct for all the plies. This fact is recognized in large tires of many plies where a certain bias angle is used for a few plies and then a correction made for the next few and so on through the tire but even this does not correct each ply. For example, in a 20 ply tire plies 1 to 8 might be cut at 30° ready for the drum, plies 9 to 14 at 31°, and plies 15 to 20 at 32°. If this correction was not made and all plies were cut on the same angle, the cords in the outer plies would be wavy or slack.

If the angle of the cords varies through such errors or if the stretchiness of the cord varies, the result in the finished, vulcanized tire, will be that some cords are relatively loose, actually sometimes wavy in the tire and do not take their share of the load. Similarly, some other cords will be tight and take more than their share of the load and consequently will be the cords to fail first in the tire.

Under my invention the harmful effects of variations in cord angle and cord stretch are minimized.

Heretofore some tires have been made with one or more plys laterally spliced, or in other words, a ply made up of two lengthwise pieces. This was done to utilize narrow pieces or strips of what would otherwise be waste fabric material but such ply would have the same bias angle as all of the remaining plies in the tire and would not have the same stretching or equalizing action as set up herein. In some instances, bicycle tires have been constructed using one lapped or spliced ply. Such construction makes use of a double width ply which is folded around the beads of the tire with the edge portions of the ply lapping in the tread region of the tire. Again, however, the angle of the spliced and continuous plies are the same whereby no desirable stretching and equalizing action is achieved in shaping the spliced fabric ply, as set up herein. In shaping such bicycle tires from cylindrical to tire shape, the bias angle of the cords becomes greater by the shaping operation, but no actual elongation or stretch of the spliced ply occurs anymore than in the unspliced ply.

In tire building practice of today, by the drum method, the plies are built up into a cylindrical structure upon a collapsible drum which usually has bead engaging means provided at the edges of the drum. The drum width is very carefully calculated and even then is often subject to adjustments by trial and error processes. Tires can sometimes be built for weeks on a given drum width and then suddenly a variable creeps in for some unknown reason and the drum width must be changed to produce the same size tire. Such width changes often amount to ¼ to ½" or even more, whereas until such drum width change is made, inaccurate tires have been built, which tires have poor utilization of the reinforcing cords in the plies in the tire.

It is the general object of the present invention to avoid and overcome the foregoing and other difficulties with and disadvantages of present tire building procedures, and to provide a novel tire and method of building the same, characterized by the fact that all of the cords in the different reinforcing plies thereof have substantially equal stresses therein in the resultant tire.

Another object of the invention is to provide a novel tire construction, which tire is made from a plurality of spliced plies with the splices extending circumferentially of the tire.

Another object of the invention is to provide a slippage arrangement at splices in the tire plies so that tires can be built in a way to efficiently utilize the cord strength of the reinforcing plies without repeated drum width changes.

Yet another object of the invention is to compensate substantially completely for manufacturing variations in the cord angle and cord strength in different reinforcing plies in tires.

Another object of the invention is to avoid the occurrence of slack or tight cords in a finished tire.

Still another object of the invention is to increase the life of a tire cord body by having all cords therein under substantially equal stresses and substantially equally sharing the load.

Still another object of the invention is to provide a pneumatic tire wherein substantially all of the reinforcing plies therein are of a spliced or lapped construction whereas at least one continuous ply, or a pair of plies, of a different and smaller bias angle is also provided in the tire and limits stretch of the spliced plies during the tire shaping operation.

Other objects of the invention are to be able to use one ply angle for all plies on even the largest tires and still not get wavy or loose cords in the finished tire; to avoid plies pulling around the tire beads too tightly and producing narrow or misshapen beads; and to be able to build a tire in which the cords in some plies are intentionally positioned on a widely different angle of bias than the cords in other plies in the tire body.

The foregoing and other objects and advantages of the invention will be made more apparent as the specification proceeds.

The present invention, broadly speaking, relates to the construction of a tire using plies therein which have sets of reinforcing cords therein with each set of cords originating at one bead and extending towards but terminating short of the other bead, with the free ends of the cords of different sets of cords being in lapped, or spliced relation. A tire may be constructed using, in some instances, all spliced plies, whereas in other instances it may be only certain plies which are spliced with another ply or plies being continuous with the cords therein extending at a smaller bias angle than the bias angle of the cords in the spliced plies and with the width of the tire building drum and plies positioned thereon being determined by the continuous ply or plies.

In referring to the expression "bias angle" in the specification, this is taken to be the acute angle between a cord on a tire building drum and an imaginary line on the face of the drum crossing the face of drum and parallel to the axis of the drum. In referring to plies in this application, it will be appreciated that the reinforcing cords therein may be made from any desired material, such as cotton, rayon, nylon, wire, or other suitable material. The expression "cylindrical unit" as used in the specification and claims means any conventional shape of a tire carcass, which may have inwardly extending edge portions, or which may have a slight longitudinal arc therein, or otherwise vary slightly from an exact cylindrical shape.

For a better understanding of the present invention, attention is directed to the accompanying drawings, wherein.

In the accompanying drawings and the specification, corresponding numerals are used to refer the same parts to facilitate comparison and correlation between the different parts in the specification and drawings.

Figure 1:
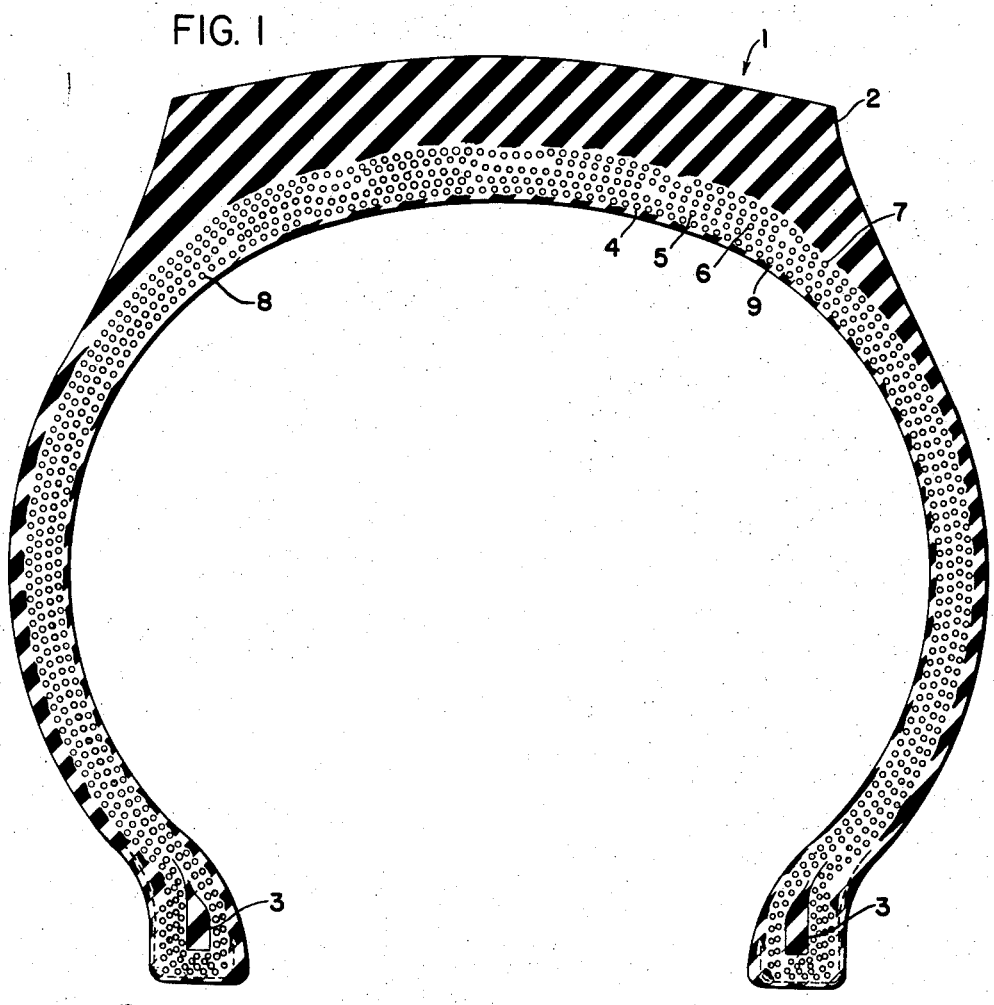
Fig. 1 is a cross section through a tire embodying the principles of the invention.

Reference now should be had to the details of the structure shown in the accompanying drawings, and a tire is indicated in general by the numeral 1. This tire 1 includes a conventional tread portion 2 and it has a pair of beads 3. The tire 1 is provided with a plurality of reinforcing plies 4, 5, 6 and 7. It will be appreciated that any desired number of plies may be present in the tire 1 but that a conventional four ply tire is shown.

Figure 2:
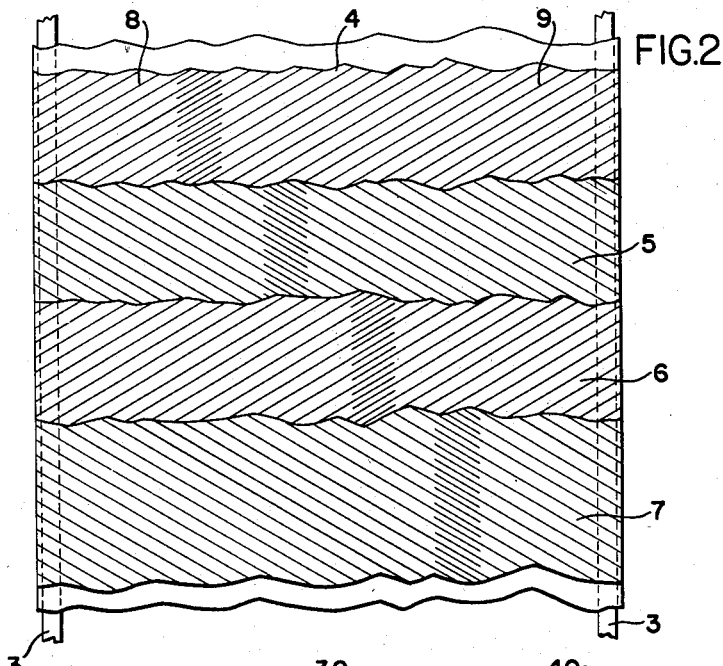
Fig. 2 is a somewhat diagrammatic plan view of a plurality of plies broken away to show the relative positions of the plies as built up into a cylindrical unit upon a tire building drum and illustrating the method of building a tire of the invention.
Figure 3:
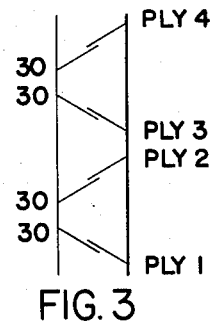
Figs. 3 through 7 are diagrammatic views similar to Fig. 2 wherein different ply arrangements for a tire of the invention are shown.

As an important feature of the present invention, all of the plies 4 through 7 are of a lapped, or spliced construction wherein the ply may be considered to be formed from two different pieces of fabric each of which terminates along one lateral margin of the ply and extends transversely of the ply only a limited distance so that the ends of the two pieces of the ply are in spliced or overlapped relation. That is, the reinforcing cords in the individual plies only extend a portion of the transverse width of the ply, and as shown in Fig. 2, the ply 4 is made up from two sets of reinforcing cords 8 and 9 with the cords 8 all being of substantially equal length, as are the cords 9, and with each set of cords terminating at and being secured to one bead of the tire with the other or inner ends of the cords being in overlapped or spliced relation whereby a splice that extends longitudinally of the ply is provided. All of the reinforcing cords in the plies 4 through 7 extend at substantially the same bias angle, which is of any desired inclination. Thirty degrees as the material is applied to the drum is a typical bias angle for plies in some tires. The edge portions of all of the plies 4 through 7 are secured around the beads 3, as indicated in Fig. 1. These plies 4 through 7 are individually applied to a tire building drum and are anchored or secured to the beads 3 in any desired or conventional manner so that a substantially cylindrical ply unit is built up on the tire building drum.

When the cylindrical unit formed upon a tire building drum from the spliced plies 4 through 7 is changed to tire shape and cross section by internal pressure applied thereto, overlapped cords of the plies are lengthened as the tire carcass is shaped or formed to toroidal shape in cross section. The shaping operation produces a toroidal sectional shape and the spliced cords extending from bead to bead of the tire are required by the invention to be longer in the tire than in the cylindrical tire carcass built upon a drum. The cord length is increased by relative slippage between the cords in the two halves of the ply during the shaping operation.

As an important feature of the present invention, when all of the plies 4 through 7 are spliced as shown, it is necessary to arrange the plies, when positioned upon a building drum, as indicated in Fig. 2, with the plies having less transverse width than plies of a conventional construction for the same size tire, so that the cords in the plies are moved with relation to each other during the tire shaping operation by slippage of the two sets of cords at the splices.

It should be particularly noted that the circumferentially extending splices provided in the plies 4 through 7 on the tire building drum are staggered or spaced transversely of the tire whereby no particularly noticeable lapped portion will be provided in the tire built-up from these different plies.

Figure 4:
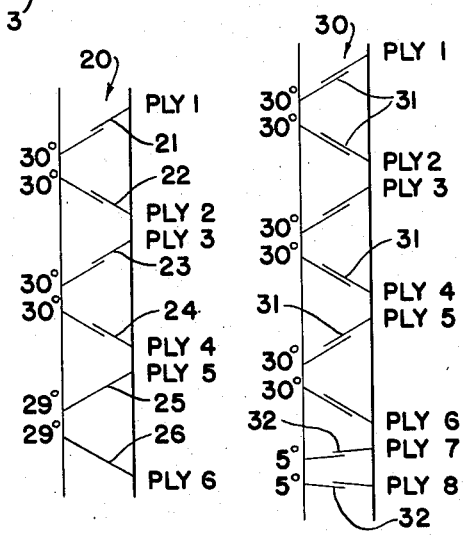

Fig. 4 shows a different embodiment of the invention wherein a six ply tire is provided and typical bias angles for the different plies are indicated. This tire 20 is provided with, for example, four spliced plies indicated by the numerals 21 through 24 and all of such plies have the same bias angle in the tire structure. However, in order to control the stretch in the tire body as it is formed to tire shape from the cylindrical building unit formed on a tire building drum, the tire 20 is provided with a pair of continuous plies 25 and 26. Fig. 4 particularly brings out that the bias angle in the plies 25 and 26 is smaller than for the spliced plies and is 29 degrees, for example, whereas the bias angle in the spliced plies is 30 degrees.

In building up the plies 21 through 26 into a cylindrical unit, it will be recognized that such unit must have a common width regardless of which of the plies is referred to. Since the continuous plies will have only a slight stretch or elongation during the tire shaping operation, accordingly their width must be used to control the width of the thirty degree spliced plies used in the tire. Since reinforcing plies having the reinforcing cords therein at a thirty degree bias angle must be longer in the completely shaped tire than reinforcing plies having cords therein at a 29 degree angle, there thus will be a resultant stretch or elongation in the spliced plies 21 through 24 as the cylindrical tire unit is shaped to torodial form in completing the tire from the built-up fabric and rubber unit produced on a tire building drum. The continuous plies 25 and 26 usually should be the outermost plies in the tire.

Figure 5:
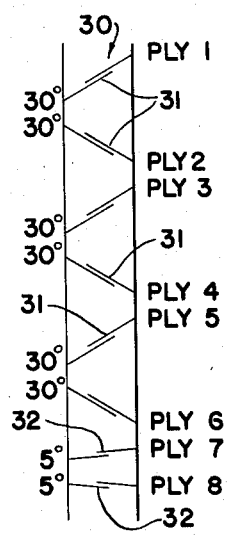

In some instances, it may be desirable to provide a tire which has reinforcing plies therein that have widely different angles of bias in different plies of the tire. Thus a tire 30 is indicated in Fig. 5 and it is shown as having a plurality of spliced plies 31 with the reinforcing cords therein having a bias angle on the order of 30 degrees whereas the remaining plies 32 have a relatively low bias angle, such as about 5 degrees, or even as low as 0°. Since the five degree cord would limit the width of the tire unit in this instance, obviously the reinforcing plies having the cords therein at a bias angle of 30 degrees would have appreciably greater slip, and would require greater initial overlap in the spliced zones, as the flat plies would be shaped to tire form, than would the plies having reinforcing cords at the five degree angle of bias.

Figure 6:
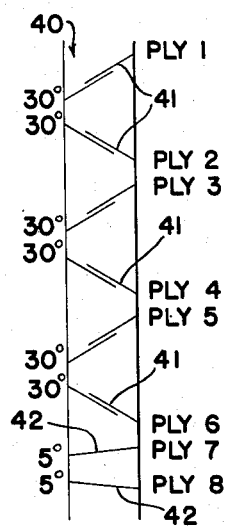

Yet another type of a tire which could be constructed in accordance with the invention is shown in Fig. 6 and indicated as an 8 ply tire 40. This tire 40 has a plurality of spliced plies 41 positioned therein with such plies having a bias angle on the order of 30 degrees. Two continuous plies 42 are also provided in the tire 40 and the bias angle of the cord of such plies may be at a relatively low angle, such as 5 degrees. Again, when the tire is shaped, the spliced plies have relatively great slip occurring in the spliced portions thereof and the plies 42 will limit the growth of expansion of the tire as it is being shaped to tire form.

Figure 7:
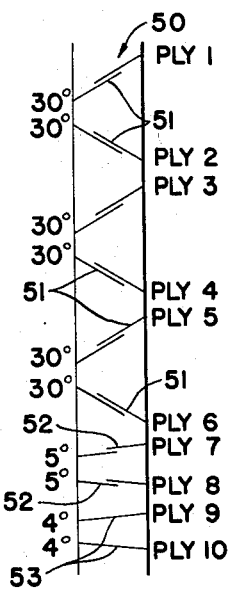

One other type of a tire is indicated by a tire 50, as shown in Fig. 7. In this instance, a plurality of reinforcing plies 51, all of which are of spliced construction, are provided in this ten ply tire and have a bias angle such as 30 degrees. Two other spliced plies 52 having the cords therein positioned at a low degree of bias, such as about five degrees, are present in the tire. Continuous plies 53 are also shown in the tire 50 and these continuous plies therefor must have a smaller or lesser bias angle, such as about 4 degrees, than any of the spliced plies in the tire whereby all of the spliced plies will be stretched during the tire shaping action.

It will be appreciated that the cylindrical tire unit of the invention may have any conventional tire elements therein, including treads, beads, chafer strips, et cetera. These tires can have a limited degree of stretch by either continuous plies positioned therein, or the tires can be shaped to toroidal form from the cylindrical form in which they are built, and have controlled stretch by means of some apparatus such as the "Bag-O-Matic" press now produced by McNeil Machine and Engineering Company and disclosed in U. S. Letters Patent Nos. 2,495,663 and 2,495,664, and which would limit the stretch in the tire. Limited stretch could also be secured by carefully measuring the tire as it is being shaped, should all of the reinforcing plies be spliced.

It will be realized that the amount of lap in the reinforcing cords of a spliced ply may vary with the amount of calculated stretch or slip that it is predetermined will result in such ply during the tire shaping operation. Obviously a surplusage of overlap is provided in all instances whereby a remaining overlap will exist in all spliced plies regardless of the relative slippage occurring between overlapped cords during the tire shaping operation. Cords which have a high bias angle will slip more at the splice than cords at a low bias angle when built into the same tire, but in all events the result is that because the spliced plies are pulled and caused to slip at the splice the stretch and angle variations between cords in any set of cords in a ply will tend to be equalized to a large degree in all cords and substantially uniform stresses can be set up in the cords in a finished tire. By anchoring one end of each cord at the bead and then stretching the spliced plies by the tire shaping operation, the different cords in each ply are pulled or drawn from the bead-engaging portions thereof to align the different cords in every ply with other cords in the same ply and avoid waviness or irregularity in the bias angles of such cords.

The lap of the spliced cords in a finished tire will be about ¾" for ordinary size rayon cord and possibly 1¼" for the lapped wires in a wire tire. These lapped portions of the reinforcing plies will be approximately as strong as the cord itself due to the strength of the bond of the lapped cords and the rubber tire carcass. Of course, a greater length or amount of fabric would normally be required in the tire of the invention than in a conventional tire because of the laps provided therein and it is thought that such greater amount of fabric totals to about three or four per cent more than that used in conventional tires. To offset this extra cost, it is expected that fewer cords per inch can be used in a reinforcing ply, or else a cheaper type of a cord can be used whereby actually a reduction in cost can be produced in the overall production cost of the tire of the invention. Such reductions in number of cords or types of cords used by practice of the present invention is due solely to the fact that the cords in a finished tire have at least substantially equalized stresses therein and share the load properly.

It will be understood that a ply of tire cord material consists of cords laid side by side in between two thin layers of rubber called skim coats. Usually the cord is given a predip of rubber cement, or similar material, and the skim coats are pressed tightly to the cords by a calendering process which presses rubber in between adjacent cords so that for all practical purposes each cord is encased in rubber.

When certain plies are provided with lapped splices in accordance with this invention, and the splices are caused to slip in the tire shaping or curing process, the cords will either slip with relation to their jackets of rubber or one ply of rubberized cord material will slip over the adjacent ply, or there may be a combination of the two actions. It will depend on which bond is stronger in the unvulcanized ply material, the bond of the cords in their jackets or the bond of one ply to an adjacent ply. During vulcanization, the rubber in the tire body will flow around and bind to all of the cords in the different reinforcing plies to produce a permanent structure wherein the reinforcing cords will take substantially uniform loads.

It is common practice to turn plies around the beads of the tire in order to tie the beads to the plies. Some plies are placed on the drum before the beads are positioned and these plies turn up around the bead a short distance. Other plies, placed on the drum after the beads are positioned, are turned down around the beads and sometimes turned up inside the tire a short distance. Altogether this forms a lacing of the plies at and around the bead.

To employ longitudinally spliced plies, the splices being in the tread region of the tire and designed to slip by using a drum narrower than if the plies were not spliced, it means, of course, that the tie-in or lacing of the plies at the bead must be such that the slip doesn't come at the bead tie-in. Actually tires have been built with a conventional tie-in or lacing at the bead using 2½" wide splices in the plies as they were applied to the drum and these splices pulled down to ¾" in the finished tire without causing any difficulty at the bead. If slippage did tend to take place in the bead tie-in, there are at least two ways and probably more to correct this and cause the slippage to take place at the longitudinal splices. One way is to lubricate the plies suitably in the region of the splices with zinc stearate powder or paste, or equivalent material so that the plies stick together only slightly, the zinc stearate not effecting adhesion in the cured tire. Another and very desirable way is to use double width plies which fold around the bead and across to the tread region of the tire thus forming two plies with the beads resting in the loop which will not permit any slippage at the beads. Incidentally, this second method saves material at the bead region which will somewhat offset the extra material in the longitudinal splices. There are machines in existence which will fold double width plies around the beads.

Figure 9:
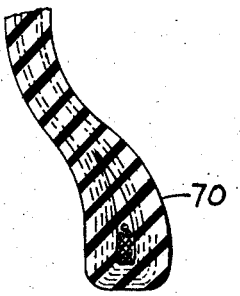
Fig. 9 is a fragmentary section through a bead of the tire like that shown in Fig. 1.
Figure 8:
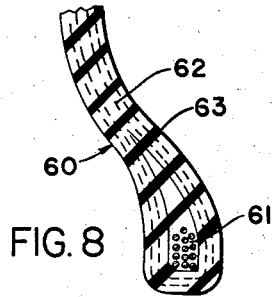
Fig. 8 is a fragmentary section through a bead of a tire embodying a modification of the invention.

Fig. 9 shows a tire 70 with a conventional tie-in of the spliced plies which may be adequate if the plies slip easily at their splices particularly with an application of zinc stearate. Fig. 8 shows the way beads 61 rest in a loop formed by the cords in plies 62 and 63 that are folded around the beads 61 in a tire 60. Usually such plies 62 and 63 are of double width, and the cords of same in a longitudinally extending zone of the ply are spliced or lapped like those on the plies referred to hereinbefore. The edge portions of the plies wrapped around the beads are of such length transversely of the tire to overlap and produce a second spliced ply in the tire.

In a conventional tire where each cord is continuous from bead to bead, the cord angle on the building drum is on the order of 30° to 35° for a 6.70-15 tire. In shaping the tire carcass to toroidal form, this angle becomes something on the order of 48° to 52° at the center of the tire. In the case of split, or laterally spliced plies, the drum is always narrower than would be correct for continuous cords. As a consequence of the drum being narrower, the cord ends in the ply at one bead are not as far advanced circumferentially around the drum in comparison to the cord ends at the opposite bead as would be the case with a wider drum. Since the advancement of cords controls the cord angle of a finished conventional tire, then a slightly higher bias angle would be used on the drum for the laterally spliced plies. In other words, the same advancement would be used on the drum for spliced plies rather than the same cord angle on the drum as a conventional tire.

In making tires, plies are positioned by pairs with the cords in different plies of a pair being oppositely inclined with relation to the imaginary line on the drum surface parallel to the axis of the drum. The invention contemplates use of a continuous ply at a zero degree of bias and such ply may be used individually with one or more pairs of bias plies.

It also may be possible to have the sets of cords or half ply used in forming a spliced ply made of tapered width with the adjacent individual cords of one set of cords being of different length and with the cords of the set being of increased length from one end of a ply to the other and the corresponding cords making up the other set of cords in the spliced ply are complementary in length to the varied length cords in the first set so that the overall width of the spliced ply would be uniform. In such instance, the spliced zone of a spliced ply would extend generally longitudinally of the spliced ply but would not be parallel to the marginal edges thereof. When such types or type of a ply is used, then the spliced zones of a plurality of spliced plies would necessarily be arranged in the tire with circumferentially spaced starting points for the splices in the different spliced plies whereby the spliced zones would not be radially superimposed in the tire.

It will be appreciated that, if desired, all of the plies of the tire may be made from or have a spliced construction if desired and all of such spliced plies may have the same bias angle in the tire.

From the foregoing, it will be observed that the invention provides a novel tire building method by which the reinforcing plies in a tire can be efficiently utilized by stressing the individual cords in the different plies at least substantially uniformly. Also the method permits use of different bias angle plies in one tire, if desired so that the objects of the invention are achieved, and a novel tire with desirable physical properties is produced.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. That method of constructing a pneumatic tire comprising the steps of placing a plurality of plies in cylindrical form in superimposed relation, all of such plies being spliced transversely thereof and all plies being of the same bias angle and being narrower in width than continuous cord plies for the same size tire, and forming the superimposed plies to tire shape in cross section by internal pressure and producing slippage of the cords in the spliced plies by such forming action.

2. That method of constructing a pneumatic tire comprising the steps of placing a plurality of plies having reinforcing cords therein in cylindrical form and in superimposed relation, some of such plies being spliced plies made from sets of cords with ends of one set of cords engaging one bead of the tire and ends of the other set of cords engaging the other bead of the tire and with the other ends of the cords being in overlapped relation, at least one of said plies having continuous cords extending from edge to edge thereof and being at a smaller bias angle than the cords in said spliced plies, said continuous cord ply being of normal width and the remaining plies being of the width of the continuous cord ply, and forming the superimposed plies to tire shape in cross section by internal pressure and producing slippage between the lapped cords of the spliced plies by such forming action.

3. That method of constructing a pneumatic tire having a plurality of plies therein with the cords of same being at different bias angles comprising the steps of placing a plurality of plies of widely different bias angles in cylindrical form in superimposed relation, all of such plies being spliced transversely thereof and being narrower in width than continuous plies of the same ultimate bias angle would be for the same tire, the cords in the greater bias angle plies being overlapped more than the cords in the lower bias angle plies, and widening the spliced plies by forming the superimposed plies to substantially tire shape and size in cross section by internal pressure.

4. In a method of constructing a tire, the steps of assembling a cylindrical tire carcass including at least one ply therein extending from bead to bead of the carcass and with the cords of the ply being spliced once circumferentially of the carcass in the portion of the ply extending between the beads of the tire, and shaping the tire carcass to toroidal shape in cross section and simultaneously widening the spliced ply in the direction of cord length by relative slippage between the spliced portions thereof.

5. A method as in claim 4 wherein a ply having cords extending continuously from bead to bead of the tire is assembled in the tire carcass, the cords in the continuous ply extending at a smaller bias angle than the cords in the spliced ply.

6. The method of constructing a pneumatic tire comprising the steps of preparing several pairs of right and left bias plies of cord reinforcing material, each of said plies being formed from two pieces joined by a lapped splice extending lengthwise of the ply, the lap being of a width sufficient to allow slippage of the splice with enough width of lap remaining after slippage to give a splice as strong, after vulcanization, as if the cords were continuous and not spliced, forming the plies one upon another to form a band shape structure with at least some of the plies interlocked around a pair of beads at the edges of the band, and shaping the band by internal pressure to toroidal shape in cross section and causing the spliced plies to slip at the spliced areas thereof and produce a straightening action on the cords in such spliced plies.

7. A method as in claim 6 wherein at least two pairs of plies are provided with the cords of different pairs being at widely different bias angles and with at least one pair of spliced plies being of a bias to produce a bias on the order of 48° to 52° at the center of the finished tire.

8. A method of constructing a pneumatic tire comprising the steps of preparing at least three or more plies of cord reinforcing material with at least a pair of the plies being of oppositely directed bias sufficient to produce a bias on the order of 48° to 52° at the center of the finished tire, the other ply being of a bias less than the two plies referred to, each of said pair of plies being made up of two pieces by means of a lapped splice lengthwise of the ply, assembling the plies into a band like structure with some of the plies interlocking a pair of beads on the edges of the band, and shaping the band to a tire like shape in cross section by means of internal pressure, said shaping action causing all plies which are in two pieces to slip at the splices but retaining some overlap at the splices after slipping.

9. A method of constructing a pneumatic tire comprising the steps of preparing at least three or more plies of cord reinforcing material with at least a pair of the plies being of oppositely directed bias sufficient to produce a bias on the order of 48° to 52° at the center of the finished tire, the other ply being of a bias of substantially zero degrees, each of said pair of plies being made up of two pieces by means of a lapped splice lengthwise of the ply, assembling the plies into a band like structure with some of the plies interlocking a pair of beads on the edges of the band, and shaping the band to a tire like shape in cross section by means of internal pressure, said shaping action causing the cords in said pair of plies to slip at the splices about 1¾" but retaining some overlap at the splices after slipping.

10. That method of constructing a pneumatic tire comprising the steps of placing a plurality of plies having reinforcing cords therein in cylindrical form in superimposed relation, all of such plies and reinforcing cords therein being spliced transversely thereof, and shaping the superimposed plies to tire shape in cross section by internal pressure applied thereto and producing slippage at said splices by such shaping action but leaving the reinforcing cords in spliced relation.

11. That method of making a pneumatic tire comprising the steps of making a plurality of cord containing rubber plies wherein the cords extend transversely of the plies at bias angles and all of such cords extend only a portion of the width of the ply from one lateral margin thereof but are in overlapped relation to cords from the other lateral margin of the ply, assembling a plurality of said plies into a substantially cylindrical unit, altering the shape of the cylindrical unit to tire form in cross section by internal pressure and causing slippage between the lapped cords, and restricting the expansion of the unit while being shaped to tire form.

12. A method of building a tire from a cylindrically shaped carcass comprising providing a bias fabric ply longitudinally spliced intermediate the transverse margins thereof, the cords in which ply are overlapped at least about 2½" to provide spliced plies, assembling at least a pair of spliced plies in cylindrical shape, securing the transverse edges of the plies to tire beads to provide a tire carcass, and expanding the tire carcass to toroidal shape in cross section and producing spliced plies in which the cords of the ply are overlapped about ¾" by relative slippage of the overlapped cords of the spliced plies.

13. In a method of constructing a tire, the steps of assembling a cylindrical tire carcass including at least one double width ply therein extending from bead to bead of the carcass, said ply forming two layers in the carcass with the ply being folded around the beads of the tire and with each layer having sets of cords therein spliced once in the direction extending circumferentially of the carcass in the portion of the layer spaced from the beads, and shaping the cylindrical tire carcass to toroidal shape in cross section and simultaneously widening the layers of the ply in the direction in which the cords extend by relative slippage of the overlapped cords of the sets of cords in the layers formed by the ply.

14. In a method of constructing a tire, the steps of assembling a cylindrical tire carcass including at least one wire cord ply therein extending from bead to bead of the carcass, said wire cord ply having sets of wire cords therein spliced once circumferentially of the carcass in the portion of the layer spaced from the beads, and shaping the cylindrical tire carcass to toroidal shape in cross section and simultaneously widening the wire cord ply in the direction in which the cords extend by relative slippage of the overlapped cords of the sets of cords in the ply, the sets of wire cord in the shaped tire carcass being overlapped about 1¼".

15. That method of constructing a pneumatic tire comprising the steps of placing a plurality of plies having reinforcing cords therein in cylindrical form in superimposed relation, some of such plies and reinforcing cords therein being spliced intermediate the lateral margins thereof, at least one radially outermost ply having cords therein extending continuously from bead to bead of a cylindrical tire carcass formed from the plies, and shaping the superimposed plies to tire shape in cross section and producing slippage at said splices by such shaping action but leaving the reinforcing cords in spliced relation.

References Cited in the file of this patent

UNITED STATES PATENTS

| Number | Name | Date |
|---|---|---|
| 1,165,576 | Dech | Dec. 28, 1915 |
| 1,364,870 | Ehle | Jan. 11, 1921 |
| 1,374,505 | Hopkinson | Apr. 12, 1921 |
| 1,428,040 | Kratz | Sept. 5, 1922 |
| 1,493,674 | Hopkinson | May 13, 1924 |
| 1,579,817 | Keith | Apr. 6, 1926 |
| 1,581,743 | Kearns et al. | Apr. 20, 1926 |
| 1,818,944 | Darrow | Aug. 11, 1931 |
| 1,862,492 | Mallory | June 7, 1932 |
| 1,871,438 | Abbott | Aug. 16, 1932 |
| 1,918,553 | Musselman | July 18, 1933 |
| 2,007,909 | State | July 9, 1935 |
| 2,310,776 | Gay | Feb. 9, 1943 |
| 2,432,630 | Purdy | Dec. 16, 1947 |
| 2,451,973 | Purdy | Oct. 19, 1948 |